US009969151B2

United States Patent
Zhang et al.

(10) Patent No.: US 9,969,151 B2
(45) Date of Patent: May 15, 2018

(54) HIGH SOUND ABSORPTION COEFFICIENT EXPANDED PTFE COMPOSITE FIBER COTTON

(71) Applicant: PANASIAN MICROVENT TECH (JIANGSU) CORPORATION, Changzhou, Jiangsu (CN)

(72) Inventors: Yun Zhang, Jiangsu (CN); Ronghua Ding, Jiangsu (CN)

(73) Assignee: PANASIAN MICROVENT TECH (JIANGSU) CORPORATION, Changzhou (CN)

( * ) Notice: Subject to any disclaimer, the term of this patent is extended or adjusted under 35 U.S.C. 154(b) by 160 days.

(21) Appl. No.: 14/993,115

(22) Filed: Jan. 12, 2016

(65) Prior Publication Data

US 2016/0121588 A1    May 5, 2016

Related U.S. Application Data

(63) Continuation of application No. PCT/CN2014/077162, filed on May 9, 2014.

(30) Foreign Application Priority Data

Jul. 23, 2013    (CN) .......................... 2013 1 0310756

(51) Int. Cl.
    *B32B 27/12*    (2006.01)
    *B32B 27/32*    (2006.01)
    (Continued)

(52) U.S. Cl.
    CPC .............. *B32B 27/12* (2013.01); *B32B 5/022* (2013.01); *B32B 5/16* (2013.01); *B32B 5/24* (2013.01);
    (Continued)

(58) Field of Classification Search
    CPC ..................................................... B32B 27/12
    See application file for complete search history.

(56) References Cited

U.S. PATENT DOCUMENTS

| 2,897,908 A | * | 8/1959 | Barshefsky | ........... | E04B 1/8209 |
| | | | | | 181/295 |
| 2009/0197091 A1 | * | 8/2009 | Kirk, II | ..................... | B32B 7/12 |
| | | | | | 428/422 |

FOREIGN PATENT DOCUMENTS

| CN | 202422724 U | * | 9/2012 |
| CN | 103177719 A | * | 6/2013 |

OTHER PUBLICATIONS

CN 202422724U, Machine Translation.*
(Continued)

*Primary Examiner* — Callie Shosho
*Assistant Examiner* — Patrick N English

(57) ABSTRACT

The present invention discloses a high sound absorption coefficient expanded PTFE composite fiber cotton, comprising a melt-blown high polymer fibrous layer and an expanded PTFE film layers or a modified film layer of expanded PTFE, the modified film layer of expanded PTFE is made by conducting modification treatment to a PTFE film; the high sound absorption efficiency expanded PTFE composite fiber cotton is made by combining the melt-blown high polymer fibrous layer and the expanded PTFE film layer or the modified film layer of expanded PTFE. Thus, the present invention with better full-frequency sound absorption capability and marked full-frequency sound absorption effect can be bound in a large area or filled on automobiles' engine hoods, body racks or the inner side face of automobile trunks to substantially absorb automobile noise; it has advantages such as chemical inertness, waterproof, dustproof, permeable filterability, long service life and weldability.

7 Claims, 3 Drawing Sheets

(51) Int. Cl.
*B32B 5/02* (2006.01)
*B32B 5/16* (2006.01)
*B32B 5/30* (2006.01)
*B32B 5/24* (2006.01)
*B32B 7/04* (2006.01)
*B32B 7/12* (2006.01)

(52) U.S. Cl.
CPC ............... *B32B 5/30* (2013.01); *B32B 7/04* (2013.01); *B32B 7/12* (2013.01); *B32B 27/322* (2013.01); *B32B 2262/02* (2013.01); *B32B 2262/0253* (2013.01); *B32B 2264/0257* (2013.01); *B32B 2266/025* (2013.01); *B32B 2307/102* (2013.01); *B32B 2307/304* (2013.01); *B32B 2307/3065* (2013.01); *B32B 2307/714* (2013.01); *B32B 2307/7145* (2013.01); *B32B 2307/7265* (2013.01); *B32B 2605/003* (2013.01); *B32B 2605/08* (2013.01)

(56) References Cited

OTHER PUBLICATIONS

Zhang, CN 103177719A, Machine Translation.*
International Search Report of PCT Patent Application No. PCT/CN2014/077162 dated Jul. 1, 2014.

* cited by examiner

HIGH SOUND ABSORPTION COEFFICIENT EXPANDED PTFE COMPOSITE FIBER COTTON

CROSS-REFERENCE TO RELATED APPLICATIONS

This present application is a Continuation Application of PCT application No. PCT/CN2014/077162 filed on May 9, 2014, which claims the benefit of Chinese Patent Application No. 201310310756.1 filed on Jul. 23, 2013, the contents of which are hereby incorporated by reference.

BACKGROUND OF THE INVENTION

1. Technical Field

The present invention relates to the field of sound absorbing cotton, and more specifically, to a high sound absorption coefficient expanded PTFE composite fiber cotton.

2. Description of Related Art

Although automobiles have a very beautiful shape by virtue of streamline design and smooth connection of curved surfaces, noise pollution of automobiles is still hard to decrease. Sound is produced by the to-and-fro movement of air molecules, which is caused by vibration of a body surface and this movement causes change in the air density between local compression and expansion and propagation thereof. Noise produced by a moving automobile will affect the degree of comfort persons in it feel, and makes people feel tired and sleepy more easily, which tends to cause an accident; the method for reducing noise pollution includes absorption, shielding or blocking.

Some vehicles produced abroad such as Ford, GM and VW have used new sound-absorbing materials made of fibrous composite non-woven fabric or aluminum film. The energy of sound is attenuated as noise passes through the porous materials of micro-fine fiber and causes friction. By reducing the propagation of sound energy through the reflected echo waves of composite non-woven fabric or aluminum film, sound absorption materials with the micro-fine fiber technology convert most noise energy into heat, substantially reducing the noise in automobiles. Some vehicles produced nationally also begin to use the noise reduction technology, but sound absorbing products for automobiles have to be imported and the market of sound absorbing cottons has been monopolized by foreign enterprises.

BRIEF SUMMARY OF THE INVENTION

The technical problem that the present invention solves is to provide a high sound absorption coefficient expanded PTFE composite fiber cotton, which can absorb noise at a full-frequency range. When applied to automobiles, it can be bound in a large area or filled on automobiles' engine hoods, body racks or the inner side face of automobile trunks to substantially absorb automobile noise. The greater part of noise transmitted to automobiles is absorbed, significantly reducing the noise in automobiles and providing a comfortable driving experience.

To solve the technical problem above, the present invention adopts the following technical solution: provision of a high sound absorption coefficient expanded PTFE composite fiber cotton which comprises a melt-blown high polymer fibrous layer and an expanded PTFE film layer or a modified film layer of expanded PTFE;

the melt-blown high polymer fibrous layer is made by hot-melting polymer with high-speed hot air, drafting and stretching melted polymer into super-fine fibers, melt-blowing the super-fine fibers, finally cooling and solidifying to form a fibrous web layer;

the modified film layer of expanded PTFE is made by conducting the modification treatment to PTFE a film;

the high sound absorption efficiency expanded PTFE composite fiber cotton is made by combining the melt-blown high polymer fibrous layer and the expanded PTFE film layer or by combining the melt-blown high polymer fibrous layer and the modified film layer of expanded PTFE.

In one preferred embodiment of the present invention, one side of the melt-blown high polymer fibrous layer is combined and joined with the expanded PTFE film layer or the modified film layer of expanded PTFE through heating or ultrasonic welding.

In one preferred embodiment of the present invention, both the front side and the reverse side of the melt-blown high polymer fibrous layer are combined and joined with the expanded PTFE film layer or the modified film layer of expanded PTFE through heating or ultrasonic welding.

In one preferred embodiment of the present invention, the fibers of the melt-blown high polymer fibrous layer are hot-melted and joined on the expanded PTFE film layer or the modified film layer of expanded PTFE by making use of the residual heat of high polymer after melt-blowing and hot air in drafting.

In one preferred embodiment of the present invention, one side or both the front side and the reverse side of the melt-blown high polymer fibrous layer are bound and combined with the expanded PTFE film layer or the modified film layer of expanded PTFE through an adhesive layer.

In one preferred embodiment of the present invention, the melt-blown high polymer fibrous layer is combined with both the front side and the reverse side of the expanded PTFE film layer or the modified film layer of expanded PTFE through binding and welding.

In one preferred embodiment of the present invention, the temperature of the joining surface for heating or ultrasonic welding and joining through hot-melting is controlled in the range of 210° C.~230° C.

In one preferred embodiment of the present invention, the adhesive layer is polyurethane glue or a multipolymer glue of vinyl acetate and ethylene unsaturated units.

In one preferred embodiment of the present invention, the following steps are included:

1) preparations, includes preparing melt-blown high polymer fibrous layers, expanded PTFE film layers and modified film layers of expanded PTFE;

2) unreeling the melt-blown high polymer fibrous layers, expanded PTFE film layers and modified film layers of expanded PTFE;

3) combining the melt-blown high polymer fibrous layer with the expanded PTFE film layers or the modified film layer of expanded PTFE, and adjusting the thickness;

4) finally, inspecting and testing the finished expanded PTFE composite fiber cotton, and packaging it if accepted.

In one preferred embodiment of the present invention, the modified film layer of expanded PTFE is made in the following way: an expanded PTFE film is combined with a modifying layer by employing the corona treatment to form a modified film layer of expanded PTFE that allows gluing or welding.

The beneficial effects of the present invention: the high sound absorption coefficient expanded PTFE composite fiber cotton according to the present invention has better full-frequency sound absorption capability and marked full-frequency sound absorption effect, especially better to low and medium frequency noises. It can be bound in a large area or filled on automobiles' engine hoods, body racks or the inner side face of automobile trunks to substantially absorb automobile noise; besides, it has many advantages such as chemical inertness, waterproof, dustproof, permeable filterability (internal and external pressure balance), long service life and weldability.

BRIEF DESCRIPTION OF THE SEVERAL VIEWS OF THE DRAWINGS

The drawings used in describing the embodiments are briefed hereinafter to better understand the technical solution of the embodiments of the present invention. It is clear that the drawings in the following description only serve as some embodiments of the present invention. Those skilled in the art may make other drawings based on these drawings without contributing creative labor, wherein.

Figure 1:
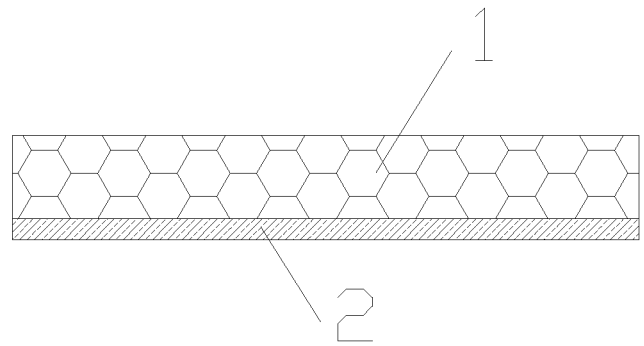
FIG. 1 is a structural diagram of one preferred embodiment of the high sound absorption coefficient expanded PTFE composite fiber cotton according to the present invention.

The parts of the drawings are marked as below: 1. melt-blown high polymer fibrous layer, 2. expanded PTFE film layers or modified film layer of expanded PTFE, 3. adhesive layer, 4. receiving arrangement, 5. melt-blowing equipment.

DETAILED DESCRIPTION OF THE INVENTION

A clear and complete description will be made hereinafter to the technical solution of the embodiments of the present invention. Obviously, the embodiments described are only some but not all embodiments of the present invention. Other embodiments obtained by those skilled in the art based on these drawings without contributing creative labor are all within the protection scope of the present invention.

With reference to FIGS. 1-5, the embodiments of the present invention comprise:

a high sound absorption coefficient expanded PTFE composite fiber cotton, comprising the melt-blown high polymer fibrous layer 1 and the expanded PTFE film layers or the modified film layer of expanded PTFE 2;

the melt-blown high polymer fibrous layer 1 is made in the following way: hot-melting polymer with high-speed hot air, wherein the temperature of high-speed hot air is controlled in the range of 310° C.~374° C., drafting and stretching melted polymer into 25-100 mm super-fine fibers with an average diameter of <18 μm, melt-blowing the super-fine fibers, finally cooling and solidifying to form a fibrous web layer in a receiving arrangement 4; wherein the polymer may be PP polypropylene or PET polyester.

The modified film layer of expanded PTFE is made by conducting the modification treatment to a PTFE film;

the expanded PTFE film layer is made in the following way: mixing PTFE dispersion resin and liquid extrusion aid in proportion, pre-pressing into cylinder blanks, rolling the cylinder blanks into sheets, removing extrusion aid, stretching and heat-setting to obtain an expanded PTFE microporous film layer as the final product.

The high polymer material has elasticity, flexibility and a mesh texture formed by connection of micro-fine fibers. These micro-fine fibers form numerous sound attenuation fine holes and the sound attenuation and absorption microholes have a diameter of 1~30 μm.

The modified film layer of expanded PTFE has better inertness, waterproof, air permeability, flame retardancy, high sound absorption coefficient, long service life and weldability.

The high sound absorption efficiency expanded PTFE composite fiber cotton is made by combining the melt-blown high polymer fibrous layer 1 and the expanded PTFE film layer or by combining the melt-blown high polymer fibrous layer 1 and the modified film layer of expanded PTFE.

After combining with the expanded PTFE film layers or the modified film layer of expanded PTFE 2, the melt-blown high polymer fibrous layer 1 has such a structure that the material has a large number of connecting micro-holes going through the surface to the inside, i.e. has certain air permeability. The sound absorption principle of the micro-porous material is that friction between air molecules as well as between air molecules and the material is produced as air molecules go into and out of the tiny holes, which converts sound energy into heat energy so that noise energy is consumed in the new composite material. The more and denser holes provide a powerful the sound absorption capability, forming a high-performance full-frequency sound absorbing new material with special functions. Sound waves incident on the surface of the porous new material cause the air in the micro-holes to vibrate so that a considerable part of sound energy is converted into heat energy and sound pressure is reduced by 5~7 dB at a full-frequency range under the action of frictional resistance, the viscous resistance of the air and heat conduction. The material has marked full-frequency sound absorption effect, especially better to low and medium frequency noises. When applied in the sound absorption and reduction parts of automobiles, it can absorb noise at a full-frequency range. When applied in automobiles, the greater part of noise transmitted to automobiles is absorbed, significantly reducing the noise in automobiles and providing a comfortable driving experience.

Embodiment 1: as shown in FIG. 1, one side of the melt-blown high polymer fibrous layer 1 is combined and joined with the expanded PTFE film layer or the modified film layer of expanded PTFE 2 through heating or ultrasonic welding to obtain a high sound absorption coefficient expanded PTFE composite fiber cotton as the final product.

The temperature of the joining surface for heating or ultrasonic welding of the two materials is controlled in the range of 210° C.~230° C., and the temperature delivers the best welding strength.

Figure 2:
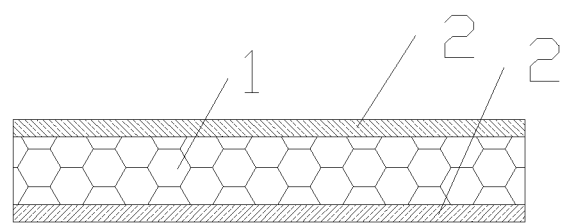
FIG. 2 is a structural diagram of another preferred embodiment of the high sound absorption coefficient expanded PTFE composite fiber cotton according to the present invention.

Embodiment 2: as shown in FIG. 2, both the front side and the reverse side of the melt-blown high polymer fibrous layer 1 are combined and joined with the expanded PTFE film layer or the modified film layer of expanded PTFE 2 through heating or ultrasonic welding to obtain a high sound absorption coefficient expanded PTFE composite fiber cotton as the final product.

The temperature of the joining surface for heating or ultrasonic welding of the two materials is controlled in the range of 210° C.~230° C., the linear movement velocity of the two materials is 0.5 m/min in combination and the temperature delivers the best welding strength.

Figure 3:
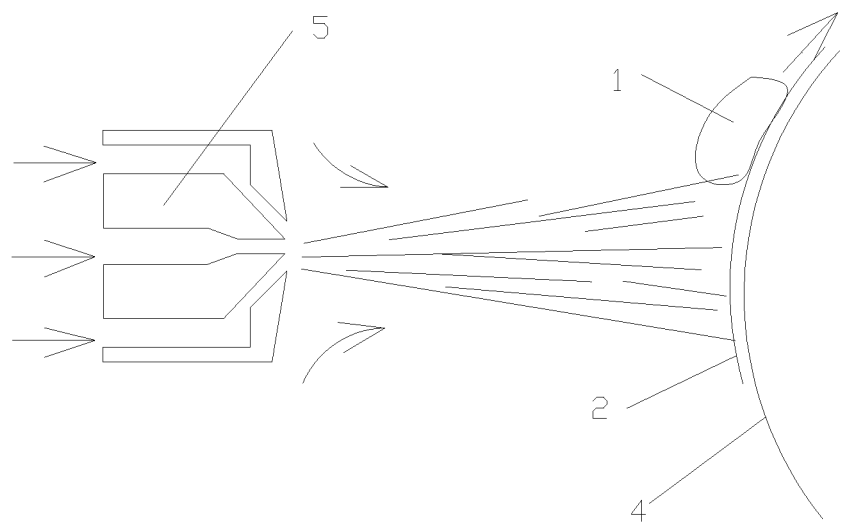
FIG. 3 is a structural diagram of another preferred embodiment of the high sound absorption coefficient expanded PTFE composite fiber cotton according to the present invention.

Embodiment 3: as shown in FIG. 3, the fibers of the melt-blown high polymer fibrous layer 1 are hot-melt and joined on the expanded PTFE film layer or the modified film layer of expanded PTFE 2 by making use of the residual heat of high polymer after melt-blowing and hot air in drafting to obtain a high sound absorption coefficient expanded PTFE composite fiber cotton as the final product.

In the process, homemade polypropylene chips with a melt index of 12 g/min and a molecular weight of 200,000 are used, the screw speed of the melt-blowing equipment 5 is 8 r/min, the receiving distance is 120 mm, the melt temperature is 318° C., the nozzle temperature is 325° C., the air temperature is 305° C., the super-fine fibers have a diameter of <18 μm, the linear speed of the receiving arrangement 4 is 2 m/min and the thickness of the fibrous layer is controlled to be less than 23 mm; the super-fine fibers are directly melt-blown and then cooled and solidified to form fiber cotton on the expanded PTFE film layer or the modified film layer of expanded PTFE 2.

Figure 4:
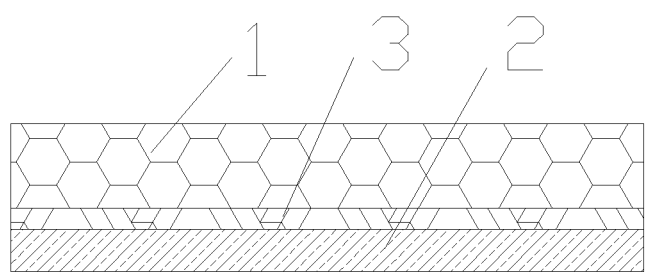
FIG. 4 is a structural diagram of another preferred embodiment of the high sound absorption coefficient expanded PTFE composite fiber cotton according to the present invention.

Embodiment 4: as shown in FIG. 4, one side or both the front side and the reverse side of the melt-blown high polymer fibrous layer 1 are bound and combined with the expanded PTFE film layer or the modified film layer 2 of expanded PTFE through an adhesive layer 3 to obtain a high sound absorption coefficient expanded PTFE composite fiber cotton as the final product.

The adhesive is polyurethane glue or a multipolymer glue of vinyl acetate and ethylene unsaturated units, suitable for gluing through manual spraying, automatic spraying or roller coating, or reactive polyurethane hot melt adhesive. Characteristics: The composite glue has excellent binding strength and softness, is high temperature resistant, washing resistant, dry-cleaning resistant, environmentally friendly and odorless, and contains no formaldehyde and free phenol.

Figure 5:
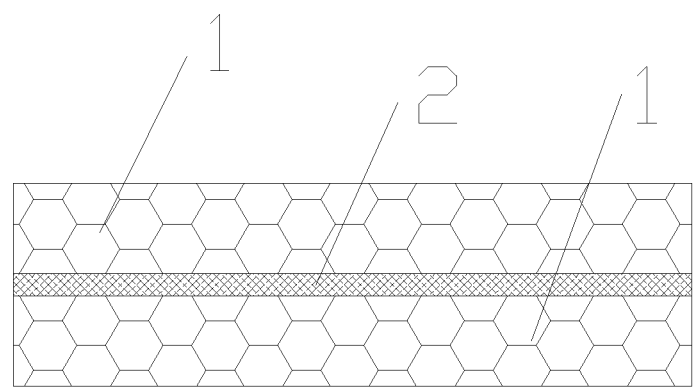
FIG. 5 is a structural diagram of another preferred embodiment of the high sound absorption coefficient expanded PTFE composite fiber cotton according to the present invention.

Embodiment 5: as shown in FIG. 5, the melt-blown high polymer fibrous layer 1 is combined on both the front side and the reverse side of the expanded PTFE film layer or the modified film layer of expanded PTFE 2 through binding or welding to obtain a high sound absorption coefficient expanded PTFE composite fiber cotton.

The temperature of the joining surface for welding is controlled in the range of 210° C.~230° C., the adhesive used in binding is polyurethane glue or a multipolymer glue of vinyl acetate and ethylene unsaturated units, suitable for gluing through manual spraying, automatic spraying or roller coating, or reactive polyurethane hot melt adhesive.

A processing method of high sound absorption coefficient expanded PTFE composite fiber cotton includes:

1) preparations, includes preparing melt-blown high polymer fibrous layers 1, expanded PTFE film layers or modified film layers of expanded PTFE 2;

2) unreeling the melt-blown high polymer fibrous layers 1, expanded PTFE film layers or modified film layers of expanded PTFE 2;

3) combining the melt-blown high polymer fibrous layer 1 with the expanded PTFE film layers or the modified film layer of expanded PTFE 2, and adjusting the thickness;

4) finally, inspecting and testing the finished expanded PTFE composite fiber cotton, and packaging it if accepted.

The modified film layer of expanded PTFE is made in the following way: an expanded PTFE film is combined with a modifying layer by employing the corona treatment to form a modified film layer of expanded PTFE that allows gluing or welding.

The high sound absorption coefficient expanded PTFE composite fiber cotton according to the present invention has better full-frequency sound absorption capability and marked full-frequency sound absorption effect, especially better to low and medium frequency noises; besides, it has many advantages such as chemical inertness, waterproof, dustproof, permeable filterability (internal and external pressure balance), long service life and weldability, specifically as follows:

1) A high sound absorption coefficient expanded PTFE composite fiber cotton, sound waves incident on the surface of the porous new material cause the air in the micro-holes to vibrate so that a considerable part of sound energy is converted into heat energy under the action of frictional resistance, the viscous resistance of the air and heat conduction and noise waves are converted into heat energy after further attenuation by smaller micro-holes of the expanded PTFE film or the modified film thereof, thus sound pressure is reduced by 5~7 dB at a full-frequency range. The material has marked full-frequency sound absorption effect, especially better to low and medium frequency noises. When applied in hi-fi sound installations and loudspeakers, it can absorb noise at a full-frequency range and leave beautiful music. When applied in indoor environments, automobiles or electromechanical equipment, the greater part of noise transmitted to automobiles is absorbed. It especially can be bound in a large area or filled on automobiles' engine hoods, body racks or the inner side face of automobile trunks to substantially absorb automobile noise, significantly reducing the noise in automobiles and providing a comfortable riding experience.

2) A high sound absorption coefficient expanded PTFE composite fiber cotton keeps a balance between the air pressure inside automobile parts and that outside automobile parts: Reducing the stress on internal parts and components to prolong the service life of products, and reducing electrical short circuits caused by fogging and condensation to improve reliability and prolong the service life of products.

3) Environmentally friendly: An environmentally friendly high sound absorption coefficient expanded PTFE composite fiber cotton is white, nontoxic, odorless, and free from volatile gases, pollution and carcinogens; does not stimulate the skin in operation like glass fibers; and can be blanked without production of dust and chips like other products.

4) Flame retardancy: A high sound absorption coefficient expanded PTFE composite fiber cotton has excellent heat resistance and therefore can be used at around 100° C. for a long time. The high sound absorption coefficient expanded PTFE composite fiber cotton has excellent heat resistance and fire performance (flame retardancy), meeting the requirements for automotive interiors. The personal and property safety is improved.

5) Dampproof: A high sound absorption coefficient expanded PTFE composite fiber cotton is hydrophobic and therefore will not mould, breed bacteria, perish and give off an offensive odor, and so it can remain stable for a long time. In a damp environment, there is no change in the sound absorption coefficient, the water absorption is no more than 1% of its own weight and the material dries easily.

6) Anti-aging: A high sound absorption coefficient expanded PTFE composite fiber cotton has no change in the sound absorption coefficient in a 120° C. environment.

7) Plasticity: a high sound absorption coefficient expanded PTFE composite fiber cotton has a lower density and therefore can be easily operated, and its compressibility and deformability allow it to be applied to space of various specifications and compact space, providing greater flexibility in product design. Resultant products are soft, light, cut at will and easy to be fixed. Spray adhesives, pressure sensitive tapes, ultrasonic welding, heat stickup or push pin stickup can be used.

8) High insulation: A high sound absorption coefficient expanded PTFE composite fiber cotton has excellent insulation performance. Since it does not absorb water, the insulation performance will not be affected.

9) Thermal insulation: A high sound absorption coefficient expanded PTFE composite fiber cotton effectively conserves more insulated air and reflects external heat, brings the inside to a comfortable temperature more quickly, keeps the internal temperature with less energy and has superior thermal insulation to down. In winter, it can protect automobiles against heat loss, while in summer, it can stop external heat from entering automobiles, reducing energy consumption of air conditioners for automobiles and introducing a new composite material for the low-carbon life in the twenty-first century.

10) Flame retardancy: Meeting the requirement for the combustion characteristic in the compulsory national standard GB8410-2006 that the combustion rate is no greater than 100 mm/min.

11) Energy-saving: A high sound absorption coefficient expanded PTFE composite fiber cotton is light and reduces the power consumption of automobiles.

The foregoing is only the embodiments of the present invention and not intended to limit the patent scope of the present invention. Any equivalent structures or procedure changes made based on the specification of the present invention, or direct or indirect application in other related technical fields are likewise included in the patent protection scope of the present invention.

What is claimed is:

1. A high sound absorption coefficient expanded PTFE composite fiber cotton, comprising a melt-blown polymer fibrous layer and an expanded PTFE film layer or a modified film layer of expanded PTFE, wherein: the melt-blown polymer fibrous layer is made by hot-melting polymer with high-speed hot air, drafting and stretching melted polymer into super-fine fibers, melt-blowing the super-fine fibers, finally cooling and solidifying to form a fibrous web layer; the modified film layer of expanded PTFE is made by conducting the modification treatment to PTFE films; the high sound absorption coefficient expanded PTFE composite fiber cotton is made by combining the melt-blown polymer fibrous layer and the expanded PTFE film layer or by combining the melt-blown polymer fibrous layer and the modified film layer of expanded PTFE, wherein the melt-blown polymer fibrous layer comprises multiple connecting micro-holes having a diameter within a range of 1-30 µm, wherein sound waves incident on the high sound absorption efficiency expanded PTFE composite fiber cotton causes vibration of air in the connecting micro-holes thereby facilitating conversion of sound energy into heat energy and reducing sound pressure by 5-7 dB, and wherein one side or both the front side and the reverse side of the melt-blown polymer fibrous layer are bound and combined with the expanded PTFE film layer or the modified film layer of expanded PTFE through an intermediate adhesive layer manually or automatically sprayed, or roller coated between the said melt-blown polymer fibrous layer and the modified film layer of expanded PTFE, wherein the intermediate adhesive layer is a multipolymer glue of vinyl acetate and ethylene saturated units.

2. The high sound absorption coefficient expanded PTFE composite fiber cotton as claimed in claim 1, wherein the composite fiber cotton is prepared through a process comprising the following steps: 1) preparing the melt-blown polymer fibrous layer and one of the expanded PTFE film layer and the modified film layer of expanded PTFE; 2) unreeling the melt-blown polymer fibrous layer and one of the expanded PTFE film layer and the modified film layer of expanded PTFE, 3) combining the melt-blown polymer fibrous layer with one of the expanded PTFE film layer and the modified film layer of expanded PTFE through the intermediate adhesive layer manually or automatically sprayed, or roller coated between the said melt-blown polymer fibrous layer and the modified film layer of expanded PTFE, and adjusting the thickness; and 4) inspecting and testing the finished expanded PTFE composite fiber cotton, and packaging the finished expanded PTFE composite fiber cotton.

3. The high sound absorption coefficient expanded PTFE composite fiber cotton as claimed in claim 2, wherein the modified film layer of expanded PTFE is made by combining an expanded PTFE film with a modifying layer by employing corona treatment to form a modified film layer of expanded PTFE that allows gluing or welding.

4. The high sound absorption coefficient expanded PTFE composite fiber cotton as claimed in claim 2, wherein the high sound absorption coefficient expanded PTFE composite fiber cotton is capable of being used in an environment with a temperature of 100° C.

5. The high sound absorption coefficient expanded PTFE composite fiber cotton as claimed in claim 4, wherein the water absorption of the high sound absorption coefficient expanded PTFE composite fiber cotton is less than or equal to 1% of the weight of the high sound absorption coefficient expanded PTFE composite fiber cotton, and wherein the sound absorption coefficient of the high sound absorption coefficient expanded PTFE composite fiber cotton remains unchanged in a damp environment.

6. The high sound absorption coefficient expanded PTFE composite fiber cotton as claimed in claim 5, wherein the sound absorption coefficient of the high sound absorption coefficient expanded PTFE composite fiber cotton remains unchanged even in an environment with a temperature of 120° C.

7. The high sound absorption coefficient expanded PTFE composite fiber cotton as claimed in claim 6, wherein the combustion rate of the high sound absorption coefficient expanded PTFE composite fiber cotton is 100 mm/min thereby complying with GB410-2006 standard requirements.

* * * * *